(12) United States Patent
Belesiu et al.

(10) Patent No.: US 8,719,603 B2
(45) Date of Patent: May 6, 2014

(54) ACCESSORY DEVICE AUTHENTICATION

(71) Applicant: Microsoft Corporation, Redmond, WA (US)

(72) Inventors: Jim Tom Belesiu, Mill Creek, WA (US); Gene Robert Obie, Clinton, WA (US); James Charles Marshall, Puyallup, WA (US); Robert D. Young, Kirkland, WA (US); Nathan C. Sherman, Bellevue, WA (US); Edward C. Giaimo, III, Bellevue, WA (US); David Neff, Bothell, WA (US); Jose R. Sousa, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/653,321

(22) Filed: Oct. 16, 2012

(65) Prior Publication Data

US 2013/0232350 A1    Sep. 5, 2013

Related U.S. Application Data

(63) Continuation of application No. 13/471,405, filed on May 14, 2012.

(60) Provisional application No. 61/606,333, filed on Mar. 2, 2012, provisional application No. 61/613,745, filed on Mar. 21, 2012, provisional application No. 61/607,451, filed on Mar. 6, 2012.

(51) Int. Cl.
*G06F 1/26* (2006.01)
*G06F 21/00* (2013.01)

(52) U.S. Cl.
USPC ................ 713/300; 713/310; 726/2; 726/36

(58) Field of Classification Search
None
See application file for complete search history.

(56) References Cited

U.S. PATENT DOCUMENTS 578,325 A    3/1897 Fleming
4,046,975 A    9/1977 Seeger, Jr.

(Continued)

FOREIGN PATENT DOCUMENTS

CN    103455149    12/2013
EP    1223722    7/2002

(Continued)

OTHER PUBLICATIONS

"Accessing Device Sensors", retrieved from <https://developer.palm.com/content/api/dev-guide/pdk/accessing-device-sensors.html> on May 25, 2012, 4 pages.

(Continued)

*Primary Examiner* — Dennis M Butler
(74) *Attorney, Agent, or Firm* — Jeremy Snodgrass; Glen Johnson; Micky Minhas (57) ABSTRACT

Accessory device authentication techniques are described. In one or more embodiments, connection of an accessory device to a host computing device is detected. Responsive to the detection, an authentication sequence may occur to verify an identity and/or capabilities of the accessory device. Upon successful authentication of the accessory device, the host device may authorize the accessory device for power exchange interactions with the host device. The host device may then draw supplemental power from a power source associated with the authorized accessory device, such as a battery or power adapter. The host device may also enable the accessory device to obtain and use power supplied by the host device in some scenarios. Power exchange between a host device and an authorized accessory may be managed in accordance with capabilities of the accessory device that are identified during authentication.

20 Claims, 5 Drawing Sheets

(56) References Cited

U.S. PATENT DOCUMENTS

| | | | |
|---|---|---|---|
| 4,065,649 A | 12/1977 | Carter et al. |
| 4,243,861 A | 1/1981 | Strandwitz |
| 4,302,648 A | 11/1981 | Sado et al. |
| 4,317,013 A | 2/1982 | Larson |
| 4,365,130 A | 12/1982 | Christensen |
| 4,492,829 A | 1/1985 | Rodrique |
| 4,527,021 A | 7/1985 | Morikawa et al. |
| 4,559,426 A | 12/1985 | Van Zeeland et al. |
| 4,577,822 A | 3/1986 | Wilkerson |
| 4,588,187 A | 5/1986 | Dell |
| 4,607,147 A | 8/1986 | Ono et al. |
| 4,651,133 A | 3/1987 | Ganesan et al. |
| 4,735,394 A | 4/1988 | Facco |
| 5,008,497 A | 4/1991 | Asher |
| 5,220,521 A | 6/1993 | Kikinis |
| 5,283,559 A | 2/1994 | Kalendra et al. |
| 5,331,443 A | 7/1994 | Stanisci |
| 5,480,118 A | 1/1996 | Cross |
| 5,546,271 A | 8/1996 | Gut et al. |
| 5,548,477 A | 8/1996 | Kumar et al. |
| 5,558,577 A | 9/1996 | Kato |
| 5,681,220 A | 10/1997 | Bertram et al. |
| 5,745,376 A | 4/1998 | Barker et al. |
| 5,748,114 A | 5/1998 | Koehn |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,842,027 A * | 11/1998 | Oprescu et al. ............... 713/300 |
| 5,874,697 A | 2/1999 | Selker et al. |
| 5,926,170 A | 7/1999 | Oba |
| 5,971,635 A | 10/1999 | Wise |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,061,644 A | 5/2000 | Leis |
| 6,112,797 A | 9/2000 | Colson et al. |
| 6,178,443 B1 | 1/2001 | Lin |
| 6,254,105 B1 | 7/2001 | Rinde et al. |
| 6,279,060 B1 | 8/2001 | Luke et al. |
| 6,329,617 B1 | 12/2001 | Burgess |
| 6,344,791 B1 | 2/2002 | Armstrong |
| 6,380,497 B1 | 4/2002 | Hashimoto et al. |
| 6,437,682 B1 | 8/2002 | Vance |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,597,347 B1 | 7/2003 | Yasutake |
| 6,600,121 B1 | 7/2003 | Olodort et al. |
| 6,603,408 B1 | 8/2003 | Gaba |
| 6,608,664 B1 | 8/2003 | Hasegawa |
| 6,617,536 B2 | 9/2003 | Kawaguchi |
| 6,651,943 B2 | 11/2003 | Cho et al. |
| 6,685,369 B2 | 2/2004 | Lien |
| 6,695,273 B2 | 2/2004 | Iguchi |
| 6,704,864 B1 | 3/2004 | Philyaw |
| 6,721,019 B2 | 4/2004 | Kono et al. |
| 6,725,318 B1 | 4/2004 | Sherman et al. |
| 6,774,888 B1 | 8/2004 | Genduso |
| 6,776,546 B2 | 8/2004 | Kraus et al. |
| 6,781,819 B2 | 8/2004 | Yang et al. |
| 6,784,869 B1 | 8/2004 | Clark et al. |
| 6,813,143 B2 | 11/2004 | Makela |
| 6,819,316 B2 | 11/2004 | Schulz et al. |
| 6,856,506 B2 | 2/2005 | Doherty et al. |
| 6,861,961 B2 | 3/2005 | Sandbach et al. |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 7,051,149 B2 | 5/2006 | Wang et al. |
| 7,083,295 B1 | 8/2006 | Hanna |
| 7,091,436 B2 | 8/2006 | Serban |
| 7,106,222 B2 | 9/2006 | Ward et al. |
| 7,123,292 B1 | 10/2006 | Seeger et al. |
| 7,194,662 B2 | 3/2007 | Do et al. |
| 7,213,991 B2 | 5/2007 | Chapman et al. |
| 7,277,087 B2 | 10/2007 | Hill et al. |
| 7,301,759 B2 | 11/2007 | Hsiung |
| 7,447,934 B2 | 11/2008 | Dasari et al. |
| 7,469,386 B2 | 12/2008 | Bear et al. |
| 7,486,165 B2 | 2/2009 | Ligtenberg et al. |
| 7,499,037 B2 | 3/2009 | Lube |
| 7,502,803 B2 | 3/2009 | Culter et al. |
| 7,542,052 B2 | 6/2009 | Solomon et al. |
| 7,558,594 B2 | 7/2009 | Wilson |
| 7,559,834 B1 | 7/2009 | York |
| RE40,891 E | 9/2009 | Yasutake |
| 7,636,921 B2 | 12/2009 | Louie |
| 7,639,876 B2 | 12/2009 | Clary et al. |
| 7,656,392 B2 | 2/2010 | Bolender |
| 7,731,147 B2 | 6/2010 | Rha |
| 7,733,326 B1 | 6/2010 | Adiseshan |
| 7,777,972 B1 | 8/2010 | Chen et al. |
| 7,782,342 B2 | 8/2010 | Koh |
| 7,813,715 B2 | 10/2010 | McKillop et al. |
| 7,822,338 B2 | 10/2010 | Wernersson |
| 7,865,639 B2 | 1/2011 | McCoy et al. |
| 7,884,807 B2 | 2/2011 | Hovden et al. |
| D636,397 S | 4/2011 | Green |
| 7,928,964 B2 | 4/2011 | Kolmykov-Zotov et al. |
| 7,944,520 B2 | 5/2011 | Ichioka et al. |
| 7,945,717 B2 | 5/2011 | Rivalsi |
| 7,973,771 B2 | 7/2011 | Geaghan |
| 7,978,281 B2 | 7/2011 | Vergith et al. |
| 8,016,255 B2 | 9/2011 | Lin |
| 8,053,688 B2 | 11/2011 | Conzola et al. |
| 8,065,624 B2 | 11/2011 | Morin et al. |
| 8,069,356 B2 | 11/2011 | Rathi et al. |
| 8,090,885 B2 | 1/2012 | Callaghan et al. |
| 8,098,233 B2 | 1/2012 | Hotelling et al. |
| 8,115,499 B2 | 2/2012 | Osoinach et al. |
| 8,117,362 B2 | 2/2012 | Rodriguez et al. |
| 8,118,274 B2 | 2/2012 | McClure et al. |
| 8,130,203 B2 | 3/2012 | Westerman |
| 8,154,524 B2 | 4/2012 | Wilson et al. |
| 8,162,282 B2 | 4/2012 | Hu et al. |
| D659,139 S | 5/2012 | Gengler |
| 8,169,421 B2 | 5/2012 | Wright et al. |
| 8,229,509 B2 | 7/2012 | Paek et al. |
| 8,229,522 B2 | 7/2012 | Kim et al. |
| 8,248,791 B2 | 8/2012 | Wang et al. |
| 8,255,708 B1 | 8/2012 | Zhang |
| 8,267,368 B2 | 9/2012 | Torii et al. |
| 8,274,784 B2 | 9/2012 | Franz et al. |
| 8,279,589 B2 | 10/2012 | Kim |
| 8,322,290 B1 | 12/2012 | Mignano |
| 8,387,078 B2 | 2/2013 | Memmott |
| 8,416,559 B2 | 4/2013 | Agata et al. |
| 8,498,100 B1 | 7/2013 | Whitt, III et al. |
| 8,543,227 B1 | 9/2013 | Perek et al. |
| 8,548,608 B2 | 10/2013 | Perek et al. |
| 8,564,944 B2 | 10/2013 | Whitt, III et al. |
| 8,570,725 B2 | 10/2013 | Whitt, III et al. |
| 8,610,015 B2 | 12/2013 | Whitt et al. |
| 8,614,666 B2 | 12/2013 | Whitman et al. |
| 8,646,999 B2 | 2/2014 | Shaw et al. |
| 2002/0134828 A1 | 9/2002 | Sandbach et al. |
| 2003/0163611 A1 | 8/2003 | Nagao |
| 2003/0197687 A1 | 10/2003 | Shetter |
| 2004/0258924 A1 | 12/2004 | Berger et al. |
| 2004/0268000 A1 | 12/2004 | Barker et al. |
| 2005/0030728 A1 | 2/2005 | Kawashima et al. |
| 2005/0057515 A1 | 3/2005 | Bathiche |
| 2005/0059489 A1 | 3/2005 | Kim |
| 2005/0134717 A1 | 6/2005 | Misawa |
| 2005/0146512 A1 | 7/2005 | Hill et al. |
| 2005/0264653 A1 | 12/2005 | Starkweather et al. |
| 2005/0264988 A1 | 12/2005 | Nicolosi |
| 2006/0085658 A1 | 4/2006 | Allen et al. |
| 2006/0125799 A1 | 6/2006 | Hillis et al. |

(56) References Cited

U.S. PATENT DOCUMENTS

| | | | |
|---|---|---|---|
| 2006/0154725 A1 | | 7/2006 | Glaser et al. |
| 2006/0156415 A1* | | 7/2006 | Rubinstein et al. ............ 726/27 |
| 2006/0181514 A1 | | 8/2006 | Newman |
| 2006/0187216 A1 | | 8/2006 | Trent, Jr. et al. |
| 2006/0195522 A1 | | 8/2006 | Miyazaki |
| 2007/0056385 A1 | | 3/2007 | Lorenz |
| 2007/0062089 A1 | | 3/2007 | Homer et al. |
| 2007/0069153 A1 | | 3/2007 | Pai-Paranjape et al. |
| 2007/0072474 A1* | | 3/2007 | Beasley et al. ................ 439/332 |
| 2007/0145945 A1 | | 6/2007 | McGinley et al. |
| 2007/0182663 A1 | | 8/2007 | Biech |
| 2007/0182722 A1 | | 8/2007 | Hotelling et al. |
| 2007/0185590 A1 | | 8/2007 | Reindel et al. |
| 2007/0200830 A1 | | 8/2007 | Yamamoto |
| 2007/0220708 A1 | | 9/2007 | Lewis |
| 2007/0234420 A1* | | 10/2007 | Novotney et al. ............... 726/16 |
| 2007/0236408 A1 | | 10/2007 | Yamaguchi et al. |
| 2007/0236475 A1 | | 10/2007 | Wherry |
| 2007/0247432 A1 | | 10/2007 | Oakley |
| 2007/0260892 A1* | | 11/2007 | Paul et al. ..................... 713/193 |
| 2007/0283179 A1 | | 12/2007 | Burnett et al. |
| 2008/0005423 A1 | | 1/2008 | Jacobs et al. |
| 2008/0053222 A1 | | 3/2008 | Ehrensvard et al. |
| 2008/0104437 A1 | | 5/2008 | Lee |
| 2008/0151478 A1 | | 6/2008 | Chern |
| 2008/0158185 A1 | | 7/2008 | Westerman |
| 2008/0174570 A1 | | 7/2008 | Jobs et al. |
| 2008/0228969 A1 | | 9/2008 | Cheah et al. |
| 2008/0238884 A1 | | 10/2008 | Harish |
| 2008/0253822 A1 | | 10/2008 | Matias |
| 2008/0309636 A1 | | 12/2008 | Feng et al. |
| 2008/0316002 A1 | | 12/2008 | Brunet et al. |
| 2008/0320190 A1 | | 12/2008 | Lydon et al. |
| 2009/0009476 A1 | | 1/2009 | Daley, III |
| 2009/0073957 A1 | | 3/2009 | Newland et al. |
| 2009/0083562 A1 | | 3/2009 | Park et al. |
| 2009/0140985 A1 | | 6/2009 | Liu |
| 2009/0195497 A1 | | 8/2009 | Fitzgerald et al. |
| 2009/0231275 A1 | | 9/2009 | Odgers |
| 2009/0251008 A1* | | 10/2009 | Sugaya ......................... 307/104 |
| 2009/0259865 A1 | | 10/2009 | Sheynblat et al. |
| 2009/0262492 A1 | | 10/2009 | Whitchurch et al. |
| 2009/0265670 A1 | | 10/2009 | Kim et al. |
| 2009/0303204 A1 | | 12/2009 | Nasiri et al. |
| 2009/0320244 A1 | | 12/2009 | Lin |
| 2009/0321490 A1 | | 12/2009 | Groene et al. |
| 2010/0001963 A1 | | 1/2010 | Doray et al. |
| 2010/0013319 A1 | | 1/2010 | Kamiyama et al. |
| 2010/0026656 A1 | | 2/2010 | Hotelling et al. |
| 2010/0038821 A1 | | 2/2010 | Jenkins et al. |
| 2010/0045633 A1 | | 2/2010 | Gettemy et al. |
| 2010/0051432 A1 | | 3/2010 | Lin et al. |
| 2010/0053534 A1 | | 3/2010 | Hsieh et al. |
| 2010/0077237 A1 | | 3/2010 | Sawyers |
| 2010/0085321 A1 | | 4/2010 | Pundsack |
| 2010/0102182 A1 | | 4/2010 | Lin |
| 2010/0103112 A1 | | 4/2010 | Yoo et al. |
| 2010/0123686 A1 | | 5/2010 | Klinghult et al. |
| 2010/0133398 A1 | | 6/2010 | Chiu et al. |
| 2010/0142130 A1 | | 6/2010 | Wang et al. |
| 2010/0149111 A1 | | 6/2010 | Olien |
| 2010/0149377 A1 | | 6/2010 | Shintani et al. |
| 2010/0161522 A1 | | 6/2010 | Tirpak et al. |
| 2010/0164857 A1 | | 7/2010 | Liu et al. |
| 2010/0171891 A1 | | 7/2010 | Kaji et al. |
| 2010/0174421 A1 | | 7/2010 | Tsai et al. |
| 2010/0180063 A1 | | 7/2010 | Ananny et al. |
| 2010/0188299 A1 | | 7/2010 | Rinehart et al. |
| 2010/0206614 A1 | | 8/2010 | Park et al. |
| 2010/0222110 A1 | | 9/2010 | Kim et al. |
| 2010/0231556 A1 | | 9/2010 | Mines et al. |
| 2010/0235546 A1 | | 9/2010 | Terlizzi et al. |
| 2010/0245221 A1 | | 9/2010 | Khan |
| 2010/0250988 A1* | | 9/2010 | Okuda et al. .................. 713/323 |
| 2010/0274932 A1 | | 10/2010 | Kose |
| 2010/0279768 A1 | | 11/2010 | Huang et al. |
| 2010/0289457 A1 | | 11/2010 | Onnerud et al. |
| 2010/0295812 A1 | | 11/2010 | Burns et al. |
| 2010/0302378 A1 | | 12/2010 | Marks et al. |
| 2010/0306538 A1 | | 12/2010 | Thomas et al. |
| 2010/0308778 A1 | | 12/2010 | Yamazaki et al. |
| 2010/0308844 A1 | | 12/2010 | Day et al. |
| 2010/0315348 A1 | | 12/2010 | Jellicoe et al. |
| 2010/0324457 A1 | | 12/2010 | Bean et al. |
| 2010/0325155 A1 | | 12/2010 | Skinner et al. |
| 2011/0012873 A1 | | 1/2011 | Prest et al. |
| 2011/0019123 A1 | | 1/2011 | Prest et al. |
| 2011/0031287 A1 | | 2/2011 | Le Gette et al. |
| 2011/0036965 A1 | | 2/2011 | Zhang et al. |
| 2011/0037721 A1 | | 2/2011 | Cranfill et al. |
| 2011/0043990 A1 | | 2/2011 | Mickey et al. |
| 2011/0055407 A1 | | 3/2011 | Lydon et al. |
| 2011/0060926 A1 | | 3/2011 | Brooks et al. |
| 2011/0069148 A1 | | 3/2011 | Jones et al. |
| 2011/0074688 A1 | | 3/2011 | Hull et al. |
| 2011/0102326 A1 | | 5/2011 | Casparian et al. |
| 2011/0134032 A1 | | 6/2011 | Chiu et al. |
| 2011/0157087 A1 | | 6/2011 | Kanehira et al. |
| 2011/0163955 A1 | | 7/2011 | Nasiri et al. |
| 2011/0164370 A1 | | 7/2011 | McClure et al. |
| 2011/0167181 A1 | | 7/2011 | Minoo et al. |
| 2011/0167287 A1 | | 7/2011 | Walsh et al. |
| 2011/0167391 A1 | | 7/2011 | Momeyer et al. |
| 2011/0179864 A1 | | 7/2011 | Raasch et al. |
| 2011/0184646 A1 | | 7/2011 | Wong et al. |
| 2011/0193787 A1 | | 8/2011 | Morishige et al. |
| 2011/0205372 A1 | | 8/2011 | Miramontes |
| 2011/0227913 A1 | | 9/2011 | Hyndman |
| 2011/0231682 A1 | | 9/2011 | Kakish et al. |
| 2011/0242138 A1 | | 10/2011 | Tribble |
| 2011/0248152 A1 | | 10/2011 | Svajda et al. |
| 2011/0248920 A1 | | 10/2011 | Larsen |
| 2011/0248941 A1 | | 10/2011 | Abdo et al. |
| 2011/0261001 A1 | | 10/2011 | Liu |
| 2011/0267272 A1 | | 11/2011 | Meyer et al. |
| 2011/0290686 A1 | | 12/2011 | Huang |
| 2011/0295697 A1 | | 12/2011 | Boston et al. |
| 2011/0297566 A1 | | 12/2011 | Gallagher et al. |
| 2011/0304577 A1 | | 12/2011 | Brown et al. |
| 2011/0316807 A1 | | 12/2011 | Corrion |
| 2012/0007821 A1 | | 1/2012 | Zaliva |
| 2012/0011462 A1 | | 1/2012 | Westerman et al. |
| 2012/0023459 A1 | | 1/2012 | Westerman |
| 2012/0024682 A1 | | 2/2012 | Huang et al. |
| 2012/0044179 A1 | | 2/2012 | Hudson |
| 2012/0047368 A1* | | 2/2012 | Chinn et al. ................... 713/175 |
| 2012/0050975 A1 | | 3/2012 | Garelli et al. |
| 2012/0068919 A1 | | 3/2012 | Lauder et al. |
| 2012/0075249 A1 | | 3/2012 | Hoch |
| 2012/0081316 A1 | | 4/2012 | Sirpal et al. |
| 2012/0092279 A1 | | 4/2012 | Martin |
| 2012/0094257 A1 | | 4/2012 | Pillischer et al. |
| 2012/0099749 A1 | | 4/2012 | Rubin et al. |
| 2012/0113579 A1 | | 5/2012 | Agata et al. |
| 2012/0117409 A1 | | 5/2012 | Lee et al. |
| 2012/0127118 A1 | | 5/2012 | Nolting et al. |
| 2012/0140396 A1 | | 6/2012 | Zeliff et al. |
| 2012/0145525 A1 | | 6/2012 | Ishikawa |
| 2012/0162693 A1* | | 6/2012 | Ito ................................. 358/1.14 |
| 2012/0175487 A1 | | 7/2012 | Goto |
| 2012/0182242 A1 | | 7/2012 | Lindahl et al. |
| 2012/0194448 A1 | | 8/2012 | Rothkopf |
| 2012/0224073 A1 | | 9/2012 | Miyahara |
| 2012/0246377 A1 | | 9/2012 | Bhesania et al. |
| 2012/0256959 A1 | | 10/2012 | Ye et al. |
| 2012/0274811 A1 | | 11/2012 | Bakin |
| 2012/0300275 A1 | | 11/2012 | Vilardell et al. |
| 2012/0312955 A1 | | 12/2012 | Randolph |
| 2013/0009413 A1 | | 1/2013 | Chiu et al. |
| 2013/0044074 A1 | | 2/2013 | Park et al. |
| 2013/0063873 A1 | | 3/2013 | Wodrich et al. |
| 2013/0067126 A1 | | 3/2013 | Casparian et al. |
| 2013/0088431 A1 | | 4/2013 | Ballagas et al. |
| 2013/0106766 A1 | | 5/2013 | Yilmaz et al. |

(56) References Cited

U.S. PATENT DOCUMENTS

| | | |
|---|---|---|
| 2013/0217451 A1 | 8/2013 | Komiyama et al. |
| 2013/0227836 A1 | 9/2013 | Whitt, III |
| 2013/0228023 A1 | 9/2013 | Drasnin |
| 2013/0228433 A1 | 9/2013 | Shaw |
| 2013/0228434 A1 | 9/2013 | Whitt, III |
| 2013/0228435 A1 | 9/2013 | Whitt, III |
| 2013/0228439 A1 | 9/2013 | Whitt, III |
| 2013/0229100 A1 | 9/2013 | Siddiqui |
| 2013/0229335 A1 | 9/2013 | Whitman |
| 2013/0229347 A1 | 9/2013 | Lutz, III |
| 2013/0229350 A1 | 9/2013 | Shaw |
| 2013/0229351 A1 | 9/2013 | Whitt, III |
| 2013/0229354 A1 | 9/2013 | Whitt, III |
| 2013/0229356 A1 | 9/2013 | Marwah |
| 2013/0229363 A1 | 9/2013 | Whitman |
| 2013/0229366 A1 | 9/2013 | Dighde |
| 2013/0229380 A1 | 9/2013 | Lutz, III |
| 2013/0229386 A1 | 9/2013 | Bathiche |
| 2013/0229534 A1 | 9/2013 | Panay |
| 2013/0229568 A1 | 9/2013 | Belesiu |
| 2013/0229570 A1 | 9/2013 | Beck et al. |
| 2013/0229756 A1 | 9/2013 | Whitt, III |
| 2013/0229757 A1 | 9/2013 | Whitt, III et al. |
| 2013/0229758 A1 | 9/2013 | Belesiu |
| 2013/0229759 A1 | 9/2013 | Whitt, III |
| 2013/0229760 A1 | 9/2013 | Whitt, III |
| 2013/0229761 A1 | 9/2013 | Shaw |
| 2013/0229762 A1 | 9/2013 | Whitt, III |
| 2013/0229773 A1 | 9/2013 | Siddiqui |
| 2013/0230346 A1 | 9/2013 | Shaw |
| 2013/0231755 A1 | 9/2013 | Perek |
| 2013/0232280 A1 | 9/2013 | Perek |
| 2013/0232348 A1 | 9/2013 | Oler |
| 2013/0232349 A1 | 9/2013 | Oler |
| 2013/0232350 A1 | 9/2013 | Belesiu et al. |
| 2013/0232353 A1 | 9/2013 | Belesiu |
| 2013/0232571 A1 | 9/2013 | Belesiu |
| 2013/0300590 A1 | 11/2013 | Dietz |
| 2013/0300647 A1 | 11/2013 | Drasnin |
| 2013/0301199 A1 | 11/2013 | Whitt |
| 2013/0301206 A1 | 11/2013 | Whitt |
| 2013/0304941 A1 | 11/2013 | Drasnin |
| 2013/0322000 A1 | 12/2013 | Whitt |
| 2013/0322001 A1 | 12/2013 | Whitt |
| 2013/0332628 A1 | 12/2013 | Panay |
| 2014/0012401 A1 | 1/2014 | Perek |
| 2014/0043275 A1 | 2/2014 | Whitman |
| 2014/0048399 A1 | 2/2014 | Whitt, III |

FOREIGN PATENT DOCUMENTS

| | | |
|---|---|---|
| EP | 1591891 | 11/2005 |
| EP | 2353978 | 8/2011 |
| GB | 2123213 | 1/1984 |
| JP | 56108127 | 8/1981 |
| JP | 10326124 | 12/1998 |
| JP | 1173239 | 3/1999 |
| JP | 2006294361 | 10/2006 |
| KR | 10-2011-0087178 A | 8/2011 |
| WO | WO-2006044818 | 4/2006 |

OTHER PUBLICATIONS

"ACPI Docking for Windows Operating Systems", Retrieved from: <http://www.scritube.com/limba/engleza/software/ACPI-Docking-for-Windows-Opera331824193.php> on Jul. 6, 2012, 10 pages.

"DR2PA", retrieved from <http://www.architainment.co.uk/wp-content/uploads/2012/08/DR2PA-AU-US-size-Data-Sheet-Rev-H_LOGO.pdf> on Sep. 17, 2012, 4 pages.

"First One Handed Fabric Keyboard with Bluetooth Wireless Technology", Retrieved from: <http://press.xtvworld.com/article3817.html> on May 8, 2012,(Jan. 6, 2005), 2 pages.

"Force and Position Sensing Resistors: An Emerging Technology", *Interlink Electronics*, Available at <http://staff.science.uva.nl/~vlaander/docu/FSR/An_Exploring_Technology.pdf>,(Feb. 1990), pp. 1-6.

"Frogpad Introduces Weareable Fabric Keyboard with Bluetooth Technology", Retrieved from: <http://www.geekzone.co.nz/contentasp?contentid=3898> on May 7, 2012,(Jan. 7, 2005), 3 pages.

"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 4 pages.

"Membrane Keyboards & Membrane Keypads", Retrieved from: <http://www.pannam.com/> on May 9, 2012,(Mar. 4, 2009), 2 pages.

"Motion Sensors", *Android Developers*, retrieved from <http://developer.android.com/guide/topics/sensors/sensors_motion.html> on May 25, 2012, 7 pages.

"NI Releases New Maschine & Maschine Mikro", Retrieved from <http://www.djbooth.net/index/dj-equipment/entry/ni-releases-new-maschine-mikro/> on Sep. 17, 2012, 19 pages.

"Position Sensors", *Android Developers*, retrieved from <http://developer.android.com/guide/topics/sensors/sensors_position.html> on May 25, 2012, 5 pages.

"SoIRxTM E-Series Multidirectional Phototherapy ExpandableTM 2-Bulb Full Body Panel System", Retrieved from: <http://www.solarcsystems.com/us_multidirectional_uv_light_therapy_1_intro.html > on Jul. 25, 2012,(2011), 4 pages.

"Virtualization Getting Started Guide", *Red Hat Enterprise Linux 6, Edition 0.2*, retrieved from <http://docs.redhat.com/docs/en-US/Red_Hat_Enterprise_Linux/6/html-single/Virtualization_Getting_Started_Guide/index.html> on Jun. 13, 2012, 24 pages.

Block, Steve et al., "DeviceOrientation Event Specification", *W3C, Editor's Draft*, retrieved from <https://developer.palm.com/content/api/dev-guide/pdk/accessing-device-sensors.html> on May 25, 2012,(Jul. 12, 2011), 14 pages.

Brown, Rich "Microsoft Shows Off Pressure-Sensitive Keyboard", retrieved from <http://news.cnet.com/8301-17938_105-10304792-1.html> on May 7, 2012, (Aug. 6, 2009), 2 pages.

Butler, Alex et al., "SideSight: Multi-"touch" Interaction around Small Devices", *In the proceedings of the 21st annual ACM symposium on User interface software and technology.*, retrieved from <http://research.microsoft.com/pubs/132534/sidesight_cry3.pdf> on May 29, 2012,(Oct. 19, 2008), 4 pages.

Crider, Michael "Sony Slate Concept Tablet "Grows" a Kickstand", Retrieved from: <http://androidcommunity.com/sony-slate-concept-tablet-grows-a-kickstand-20120116/> on May 4, 2012,(Jan. 16, 2012), 9 pages.

Das, Apurba et al., "Study of Heat Transfer through Multilayer Clothing Assemblies: A Theoretical Prediction", Retrieved from <http://www.autexrj.com/cms/zalaczone_pliki/5_013_11.pdf>, (Jun. 2011), 7 pages.

Dietz, Paul H., et al., "A Practical Pressure Sensitive Computer Keyboard", In Proceedings of UIST 2009,(Oct. 2009), 4 pages.

Glatt, Jeff "Channel and Key Pressure (Aftertouch).", Retrieved from: <http://home.roadrunner.com/~jgglatt/tutr/touch.htm> on Jun. 11, 2012, 2 pages.

Hanlon, Mike "ElekTex Smart Fabric Keyboard Goes Wireless", Retrieved from: <http://www.gizmag.com/go/5048/ > on May 7, 2012,(Jan. 15, 2006), 5 pages.

Kaur, Sukhmani "Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012,(Jun. 21, 2010), 4 pages.

Khuntontong, Puttachat et al., "Fabrication of Molded Interconnection Devices by Ultrasonic Hot Embossing on Thin Polymer Films", IEEE Transactions on Electronics Packaging Manufacturing, vol. 32, No. 3,(Jul. 2009), pp. 152-156.

Linderholm, Owen "Logitech Shows Cloth Keyboard for PDAs", Retrieved from: <http://www.pcworld.com/article/89084/logitech_shows_cloth_keyboard_for_pdas.html> on May 7, 2012,(Mar. 15, 2002), 5 pages.

McLellan, Charles "Eleksen Wireless Fabric Keyboard: a first look", Retrieved from: <http://www.zdnetasia.com/eleksen-wireless-fabric-keyboard-a-first-look-40278954.htm> on May 7, 2012,(Jul. 17, 2006), 9 pages.

(56) References Cited

OTHER PUBLICATIONS

Post, E.R. et al., "E-Broidery: Design and Fabrication of Textile-Based Computing", IBM Systems Journal, vol. 39, Issue 3 & 4,(Jul. 2000), pp. 840-860.
Purcher, Jack "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012,(Jan. 12, 2012), 15 pages.
Takamatsu, Seiichi et al., "Flexible Fabric Keyboard with Conductive Polymer-Coated Fibers", In Proceedings of Sensors 2011,(Oct. 28, 2011), 4 pages.
Valliath, G T., "Design of Hologram for Brightness Enhancement in Color LCDs", Retrieved from <http://www.loreti.it/Download/PDF/LCD/44_05.pdf> on Sep. 17, 2012, 5 pages.
Williams, Jim "A Fourth Generation of LCD Backlight Technology", Retrieved from <http://cds.linear.com/docs/Application%20Note/an65f.pdf>, (Nov. 1995), 124 pages.
Zhang, et al., "Model-Based Development of Dynamically Adaptive Software", In Proceedings of ICSE 2006, Available at <http://www.irisa.fr/lande/lande/icse-proceedings/icse/p371.pdf>,(May 20, 2006), pp. 371-380.
"Corrected Notice of Allowance", U.S. Appl. No. 13/470,633, (Apr. 9, 2013), 2 pages.
"Corrected Notice of Allowance", U.S. Appl. No. 13/470,633, (Jul. 2, 2013), 2 pages.
"Final Office Action", U.S. Appl. No. 13/651,195, (Apr. 18, 2013), 13 pages.
"Final Office Action", U.S. Appl. No. 13/651,232, (May 21, 2013), 21 pages.
"Final Office Action", U.S. Appl. No. 13/651,287, (May 3, 2013), 16 pages.
"Non-Final Office Action", U.S. Appl. No. 13/563,435, (Jun. 14, 2013), 6 pages.
"Non-Final Office Action", U.S. Appl. No. 13/564,520, (Jun. 19, 2013), 8 pages.
"Non-Final Office Action", U.S. Appl. No. 13/565,124, (Jun. 17, 2013), 5 pages.
"Non-Final Office Action", U.S. Appl. No. 13/651,726, (Apr. 15, 2013), 6 pages.
"Non-Final Office Action", U.S. Appl. No. 13/651,871, (Jul. 1, 2013), 5 pages.
"Non-Final Office Action", U.S. Appl. No. 13/653,682, (Jun. 3, 2013), 14 pages.
"Non-Final Office Action", U.S. Appl. No. 13/656,055, (Apr. 23, 2013), 11 pages.
"Notice of Allowance", U.S. Appl. No. 13/471,202, (May 28, 2013), 7 pages.
"Notice of Allowance", U.S. Appl. No. 13/651,272, (May 2, 2013), 7 pages.
"Notice of Allowance", U.S. Appl. No. 13/651,304, (Jul. 1, 2013), 5 pages.
"Notice of Allowance", U.S. Appl. No. 13/651,327, (Jun. 11, 2013), 7 pages.
"Notice of Allowance", U.S. Appl. No. 13/651,726, (May 31, 2013), 5 pages.
"Cholesteric Liquid Crystal", Retrieved from: <http://en.wikipedia.org/wiki/Cholesteric_liquid_crystal> on Aug. 6, 2012,(Jun. 10, 2012), 2 pages.
"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, (Jan. 2013), 1 page.
"How to Use the iPad's Onscreen Keyboard", Retrieved from <http://www.dummies.com/how-to/content/how-to-use-the-ipads-onscreen-keyboard.html> on Aug. 28, 2012, 3 pages.
"i-lnteractor electronic pen", Retrieved from: <http://www.alibaba.com/product-gs/331004878/i_Interactor_electronic_pen.html> on Jun. 19, 2012, 5 pages.
"MPC Fly Music Production Controller", AKAI Professional, Retrieved from: <http://www.akaiprompc.com/mpc-fly> on Jul. 9, 2012, 4 pages.
"Non-Final Office Action", U.S. Appl. No. 13/471,001, (Feb. 19, 2013), 15 pages.
"Non-Final Office Action", U.S. Appl. No. 13/471,139, (Mar. 21, 2013), 12 pages.
"Non-Final Office Action", U.S. Appl. No. 13/471,202, (Feb. 11, 2013), 10 pages.
"Non-Final Office Action", U.S. Appl. No. 13/471,336, (Jan. 18, 2013), 14 pages.
"Non-Final Office Action", U.S. Appl. No. 13/651,195, (Jan. 2, 2013), 14 pages.
"Non-Final Office Action", U.S. Appl. No. 13/651,232, (Jan. 17, 2013), 15 pages.
"Non-Final Office Action", U.S. Appl. No. 13/651,272, (Feb. 12, 2013), 10 pages.
"Non-Final Office Action", U.S. Appl. No. 13/651,287, (Jan. 29, 2013), 13 pages.
"Non-Final Office Action", U.S. Appl. No. 13/651,304, (Mar. 22, 2013), 9 pages.
"Non-Final Office Action", U.S. Appl. No. 13/651,327, (Mar. 22, 2013), 6 pages.
"Non-Final Office Action", U.S. Appl. No. 13/651,871, (Mar. 18, 2013), 14 pages.
"Non-Final Office Action", U.S. Appl. No. 13/651,976, (Feb. 22, 2013), 16 pages.
"Non-Final Office Action", U.S. Appl. No. 13/653,682, (Feb. 7, 2013), 11 pages.
"Notice of Allowance", U.S. Appl. No. 13/470,633, (Mar. 22, 2013), 7 pages.
"On-Screen Keyboard for Windows 7, Vista, XP with Touchscreen", Retrieved from <www.comfort-software.com/on-screen-keyboard.html> on Aug. 28, 2012, (Feb. 2, 2011), 3 pages.
"Reflex LCD Writing Tablets", retrieved from <http://www.kentdisplays.com/products/lcdwritingtablets.html> on Jun. 27, 2012, 3 pages.
"Restriction Requirement", U.S. Appl. No. 13/471,139, (Jan. 17, 2013), 7 pages.
"Restriction Requirement", U.S. Appl. No. 13/651,304, (Jan. 18, 2013), 7 pages.
"Restriction Requirement", U.S. Appl. No. 13/651,726, (Feb. 22, 2013), 6 pages.
"Restriction Requirement", U.S. Appl. No. 13/651,871, (Feb. 7, 2013) ,6 pages.
"SMART Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>,(2009), 2 pages.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, (Jun. 2012), 2 pages.
"Tilt Shift Lenses: Perspective Control", retrieved from http://www.cambridgeincolour.com/tutorials/tilt-shift-lenses1.htm, (Mar. 28, 2008), 11 Pages.
"What is Active Alignment?", http://www.kasalis.com/active_alignment.html, retrieved on Nov. 22, 2012, 2 Pages.
Piltch, Avram "ASUS Eee Pad Slider SL101 Review", Retrieved from <http://www.laptopmag.com/review/tablets/asus-eee-pad-slider-sl101.aspx>, (Sep. 22, 2011), 5 pages.
Qin, Yongqiang et al., "pPen: Enabling Authenticated Pen and Touch Interaction on Tabletop Surfaces", In Proceedings of ITS 2010, Available at <http://www.dfki.de/its2010/papers/pdf/po172.pdf>,(Nov. 2010), pp. 283-284.
Sumimoto, Mark "Touch & Write: Surface Computing With Touch and Pen Input", Retrieved from: <http://www.gottabemobile.com/2009/08/07/touch-write-surface-computing-with-touch-and-pen-input/> on Jun. 19, 2012,(Aug. 7, 2009), 4 pages.
"Advanced Configuration and Power Management Specification", Intel Corporation, Microsoft Corporation, Toshiba Corp. Revision 1, (Dec. 22, 1996), 364 pages.

(56) References Cited

OTHER PUBLICATIONS

"Corrected Notice of Allowance", U.S. Appl. No. 13/651,327, (Sep. 23, 2013), 2 pages.
"Final Office Action", U.S. Appl. No. 13/653,682, (Oct. 18, 2013), 16 pages.
"Final Office Action", U.S. Appl. No. 13/656,055, (Oct. 23, 2013), 14 pages.
"Final Office Action", U.S. Appl. No. 13/938,930, (Nov. 8, 2013), 10 pages.
"Final Office Action", U.S. Appl. No. 13/939,002, (Nov. 8, 2013), 7 pages.
"International Search Report and Written Opinion", Application No. PCT/US2013/040968, (Sep. 5, 2013), 12 pages.
"International Search Report and Written Opinion", Application No. PCT/US2013/045049, (Sep. 16, 2013), 9 pages.
"International Search Report and Written Opinion", Application No. PCT/US2013/042550, (Sep. 24, 2013), 14 pages.
"Non-Final Office Action", U.S. Appl. No. 13/780,228, (Oct. 30, 2013), 12 pages.
"Notice of Allowance", U.S. Appl. No. 13/563,435, (Nov. 12, 2013), 5 pages.
"Notice of Allowance", U.S. Appl. No. 13/651,871, (Oct. 2, 2013), 7 pages.
"Notice to Grant", CN Application No. 201320097089.9, (Sep. 29, 2013), 2 Pages.
"Notice to Grant", CN Application No. 201320097124.7, (Oct. 8, 2013), 2 pages.
"Welcome to Windows 7", Retrieved from: <http://www.microsoft.com/en-us/download/confirmation.aspx?id=4984> on Aug. 1, 2013, (Sep. 16, 2009), 3 pages.
Prospero, Michael "Samsung Outs Series 5 Hybrid PC Tablet", Retrieved from: <http://blog.laptopmag.com/samsung-outs-series-5-hybrid-pc-tablet-running-windows-8> on Oct. 31, 2013, (Jun. 4, 2012), 7 pages.
"Corrected Notice of Allowance", U.S. Appl. No. 13/651,327, (Sep. 12, 2013), 2 pages.
"Corrected Notice of Allowance", U.S. Appl. No. 13/651,726, (Sep. 17, 2013), 2 pages.
"Final Office Action", U.S. Appl. No. 13/471,001, (Jul. 25, 2013), 20 pages.
"Final Office Action", U.S. Appl. No. 13/471,139, (Sep. 16, 2013), 13 pages.
"Final Office Action", U.S. Appl. No. 13/471,336, (Aug. 28, 2013), 18 pages.
"Final Office Action", U.S. Appl. No. 13/651,976, (Jul. 25, 2013), 21 pages.
"Non-Final Office Action", U.S. Appl. No. 13/527,263, (Jul. 19, 2013), 5 pages.
"Non-Final Office Action", U.S. Appl. No. 13/938,930, (Aug. 29, 2013), 9 pages.
"Non-Final Office Action", U.S. Appl. No. 13/939,002, (Aug. 28, 2013), 6 pages.
"Non-Final Office Action", U.S. Appl. No. 13/939,032, (Aug. 29, 2013), 7 pages.
"Notice of Allowance", U.S. Appl. No. 13/651,195, (Jul. 8, 2013), 9 pages.
"PCT Search Report and Written Opinion", Application No. PCT/US2013/028948, (Jun. 21, 2013), 11 pages.
"International Search Report", Mailed Date: Jun. 21, 2013, Application No. PCT/US2013/029461, Filed Date: Mar. 6, 2013, pp. 11.
"Non-Final Office Action", U.S. Appl. No. 14/063,912, Jan. 2, 2014, 10 pages.
"FingerWorks Installation and Operation Guide for the TouchStream ST and TouchStream LP", FingerWorks, Inc. Retrieved from <http://ec1.images-amazon.com/media/i3d/01/A/man-migrate/MANUAL000049862.pdf>, 2002, 14 pages.
"Non-Final Office Action", U.S. Appl. No. 13/651,232, Dec. 5, 2013, 15 pages.
"Non-Final Office Action", U.S. Appl. No. 13/468,918, Dec. 26, 2013, 18 pages.
"Corrected Notice of Allowance", U.S. Appl. No. 13/563,435, Jan. 14, 2014, 2 pages.
"Corrected Notice of Allowance", U.S. Appl. No. 13/563,435, Jan. 22, 2014, 2 pages.
"Foreign Office Action", CN Application No. 201320097066.8, Oct. 24, 2013, 5 Pages.
"Non-Final Office Action", U.S. Appl. No. 13/939,002, Dec. 20, 2013, 5 pages.
"Final Office Action", U.S. Appl. No. 13/939,032, Dec. 20, 2013, 5 pages.
"Restriction Requirement", U.S. Appl. No. 13/468,918, Nov. 29, 2013, 6 pages.
"Notice of Allowance", U.S. Appl. No. 13/565,124, Dec. 24, 2013, 6 pages.
"Final Office Action", U.S. Appl. No. 13/564,520, Jan. 15, 2014, 7 pages.
"Advisory Action", U.S. Appl. No. 13/939,032, Feb. 24, 2014, 2 pages.
"Non-Final Office Action", U.S. Appl. No. 13/599,635, Feb. 25, 2014, 13 pages.
"Non-Final Office Action", U.S. Appl. No. 13/471,186, Feb. 27, 2014, 8 pages.
"Non-Final Office Action", U.S. Appl. No. 13/471,405, Feb. 20, 2014, 37 pages.
"Non-Final Office Action", U.S. Appl. No. 13/564,520, Feb. 14, 2014, 5 pages.
"Non-Final Office Action", U.S. Appl. No. 13/653,682, Feb. 26, 2014, 10 pages.
"Non-Final Office Action", U.S. Appl. No. 13/656,055, Mar. 12, 2014, 17 pages.
"Notice of Allowance", U.S. Appl. No. 13/471,139, Mar. 17, 2014, 4 pages.
"Notice of Allowance", U.S. Appl. No. 13/938,930, Feb. 20, 2014, 4 pages.
"Notice of Allowance", U.S. Appl. No. 13/939,002, Mar. 3, 2014, 4 pages.

* cited by examiner

ACCESSORY DEVICE AUTHENTICATION

RELATED APPLICATIONS

This application is a continuation of and claims priority to U.S. patent application Ser. No. 13/471,405, filed May 14, 2012, entitled "Accessory Device Authentication" and further claims priority under 35 U.S.C. §119(e) to the following U.S. Provisional patent applications, the entire disclosures of each of these applications being incorporated by reference in their entirety:

U.S. Provisional Patent Application No. 61/606,333, filed Mar. 2, 2012, and titled "Usage and Authentication;"

U.S. Provisional Patent Application No. 61/613,745, filed Mar. 21, 2012, and titled "Usage and Authentication;" and U.S. Provisional Patent Application No. 61/607,451, filed Mar. 6, 2012, and titled "Spanaway Provisional."

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on. One challenge that faces developers of mobile computing devices is efficient power management and extension of battery life. For instance, a host device may supply an accessory device with power and/or draw power from an accessory device in different scenarios. However, enabling a device to give/receive power to any connected accessory device (e.g., an unauthorized device) may reduce battery life in unexpected ways and/or may be inefficient and even dangerous if power transfers are allowed to occur indiscriminately.

SUMMARY

Accessory device authentication techniques are described. In one or more embodiments, connection of an accessory device to a host computing device is detected. Responsive to the detection, an authentication sequence may occur to verify an identity and/or capabilities of the accessory device. Upon successful authentication of the accessory device, the host device may authorize the accessory device for power exchange interactions with the host device. The host device may then draw supplemental power from a power source associated with the authorized accessory device, such as a battery or power adapter. The host device may also enable the accessory device to obtain and use power supplied by the host device in some scenarios. Power exchange between a host device and an authorized accessory may be managed in accordance with capabilities of the accessory device that are identified during authentication.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Indiscriminately enabling accessory devices to exchange power with a host device may reduce battery life in unexpected ways and/or may be inefficient and even dangerous if power transfers occur between the host and incompatible device.

Accessory device authentication techniques are described. In one or more embodiments, connection of an accessory device to a host computing device is detected. Responsive to the detection, an authentication sequence may occur to verify an identity and/or capabilities of the accessory device. Upon successful authentication of the accessory device, the host device may authorize the accessory device for power exchange interactions with the host device. The host device may then draw supplemental power from a power source associated with the authorized accessory device, such as a battery or power adapter. The host device may also enable the accessory device to obtain and use power supplied by the host device in some scenarios. Power exchange between a host device and an authorized accessory may be managed in accordance with capabilities of the accessory device that are identified during authentication.

In the following discussion, an example environment and devices are first described that may employ the techniques described herein. Example procedures are then described which may be performed in the example environment and by the devices as well as in other environments and by other devices. Consequently, performance of the example procedures is not limited to the example environment/devices and the example environment/devices are not limited to performance of the example procedures.

Example Operating Environment

Figure 1:
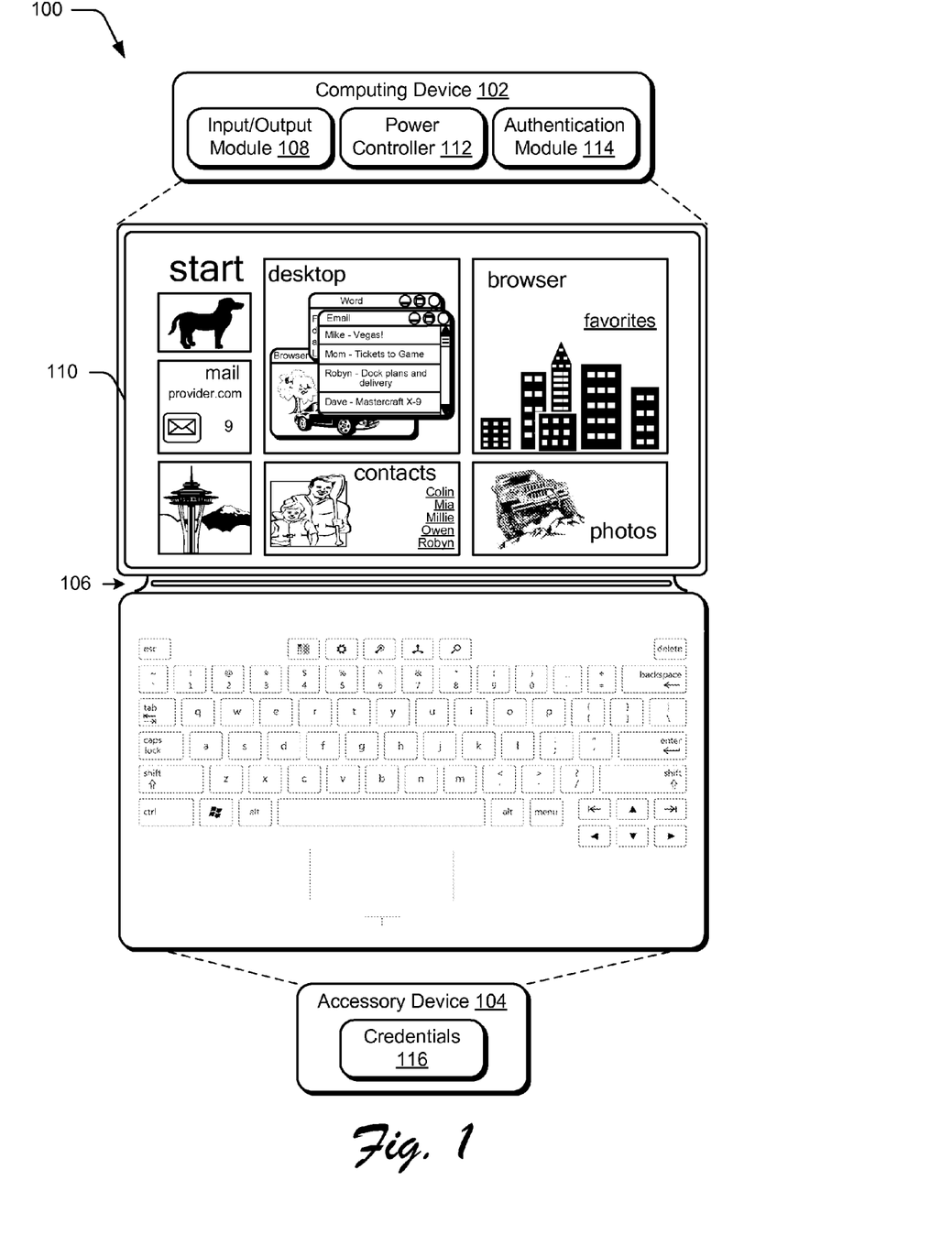
FIG. 1 is an illustration of an environment in an example implementation that is operable to employ the techniques described herein.

FIG. 1 is an illustration of an environment 100 in an example implementation that is operable to employ the techniques described herein. The illustrated environment 100 includes an example of a computing device 102 that is physically and communicatively coupled to an accessory device 104 via a flexible hinge 106. The computing device 102 may be configured in a variety of ways. For example, the computing device 102 may be configured for mobile use, such as a mobile phone, a tablet computer as illustrated, and so on. Thus, the computing device 102 may range from full resource devices with substantial memory and processor resources to a low-resource device with limited memory and/or processing resources. The computing device 102 may also relate to software that causes the computing device 102 to perform one or more operations.

The computing device 102, for instance, is illustrated as including an input/output module 108. The input/output module 108 is representative of functionality relating to processing of inputs and rendering outputs of the computing device 102. A variety of different inputs may be processed by the input/output module 108, such as inputs relating to functions that correspond to keys of the input device, keys of a virtual keyboard displayed by the display device 110 to identify gestures and cause operations to be performed that correspond to the gestures that may be recognized through the accessory device 104 and/or touchscreen functionality of the display device 110, and so forth. Thus, the input/output module 108 may support a variety of different input techniques by recognizing and leveraging a division between types of inputs including key presses, gestures, and so on.

In the illustrated example, the accessory device 104 is a device configured as a keyboard having a QWERTY arrangement of keys although other arrangements of keys are also contemplated. Further, other non-conventional configurations for an accessory device 104 are also contemplated, such as a game controller, configuration to mimic a musical instrument, a power adapter, and so forth. Thus, the accessory device 104 may assume a variety of different configurations to support a variety of different functionality. Different accessory devices may be connected to the computing device at different times.

As previously described, the accessory device 104 is physically and communicatively coupled to the computing device 102 in this example through use of a flexible hinge 106. The flexible hinge 106 represents one illustrative example of an interface that is suitable to connect and/or attach and accessory device to a host computing device 102. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one direction (e.g., vertically in the figure) yet restrict movement in other directions, such as lateral movement of the accessory device 104 in relation to the computing device 102. This may be used to support consistent alignment of the accessory device 104 in relation to the computing device 102, such as to align sensors used to change power states, application states, and so on.

The flexible hinge 106, for instance, may be formed using one or more layers of fabric and include conductors formed as flexible traces to communicatively couple the accessory device 104 to the computing device 102 and vice versa. This communication, for instance, may be used to communicate a result of a key press to the computing device 102, receive power from the computing device, perform authentication, provide supplemental power to the computing device 102, and so on. The flexible hinge 106 or other interface may be configured in a variety of ways to support multiple different accessory devices 104, further discussion of which may be found in relation to the following figure.

As further illustrated in FIG. 1 the computing device 102 may include a power controller 112 and an authentication module 114 configured to implement aspects of accessory device authentication techniques described herein. In particular, the power controller 112 represents functionality to perform various operations for power management. This may include management of different power sources and switching between the sources, implementing a defined and/or selected power management scheme, managing battery life, and so forth. The power controller 112 may also facilitate connections and communications to make use of power available via a suitable power source, such as a wall socket, internal/external battery, power supply unit, and so forth. The power controller 112 may also be operable to supply power to accessory devices that are authorized in appropriate circumstances. In other words, the power controller 112 may manage power operations jointly for a host computing device and authorized accessory devices including power exchange between the host computing device and an authorized accessory device.

The authentication module 114 represents functionality operable to authenticate accessory devices when the devices are attached/connected to the computing devices. The authentication module 114 may be configured to implement a variety of different authentication techniques. Generally speaking, the authentication module 114 performs an authentication sequence in which credentials 116 (e.g., device ID/password, alphanumeric code, etc.) associated with an accessory device 104 are obtained and verified. The accessory device 104 in FIG. 1 is illustrated as including example credentials 116, which may be provided to the authentication module 114 for authentication upon request. If the credentials are valid (e.g., the device is a recognized device that has associated privileges), the authentication is considered successful and the accessory device 104 may be authorized for power exchange through the power controller 112 and other interaction with the computing device 102. On the other hand, if the credentials are not valid, interaction of the accessory device 104 with the computing device 102 may be restricted in various ways and/or prevented. Thus, the authentication module 114 prevents unauthorized devices from supplying/using power in ways that may be inefficient and/or unsafe. Additional details regarding techniques suitable to authenticate an accessory device can be found in relation to the following figures.

The power controller 112 and authentication module 114 may be implemented in hardware, software, firmware and/or combinations thereof. By way of example and not limitation, the computing device 102 may include one or more microcontrollers and/or other suitable hardware logic devices configured to implement at least some of the functionally that is described herein in relation to power controller 112 and authentication module 114. In addition or alternatively, the power controller 112 and/or authentication module 114 may be implemented by way of a processing system of the device and one or more program modules that are executable/operable via the processing system. In addition, functionality of the power controller 112 and authentication module 114 may be provided via separate components/modules (as illustrated) or as combined functionality provided by the same module and/or microcontroller. Further description of example implementations suitable for these and other described modules/functionality can be found below in relation to the discussion of an example computing device depicted in FIG. 6.

Figure 2:
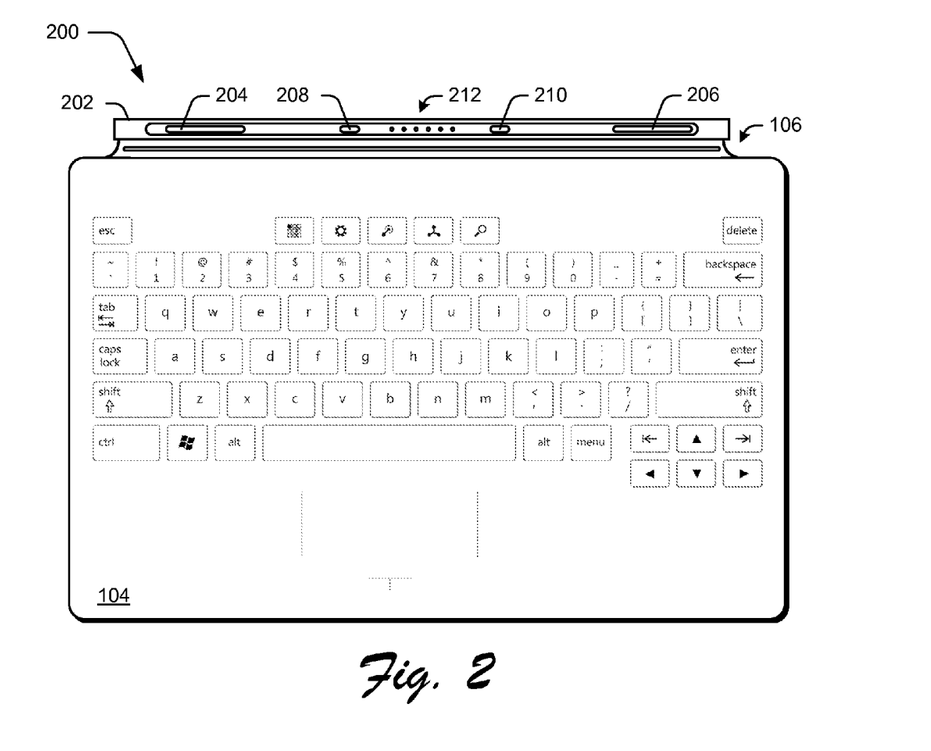
FIG. 2 depicts an example implementation of an accessory device of FIG. 1 as showing a interface in greater detail.

FIG. 2 depicts an example implementation 200 of the accessory device 104 of FIG. 1 as showing the flexible hinge 106 in greater detail. In this example, a connection portion 202 of the input device is shown that is configured to provide a communicative and physical connection between the accessory device 104 and the computing device 102. In this example, the connection portion 202 has a height and cross section configured to be received in a channel in the housing of the computing device 102, although this arrangement may also be reversed without departing from the spirit and scope thereof. The connection portion 202 provides an interface through which attachment/connection of the accessory device 104 to the computing device may be detected. In at least some embodiments, this interface enables communications for authentication of the accessory device 104 as described herein. For example, the computing device 102 may receive credentials 116 and other data regarding capabilities of the accessory device through the interface responsive to detecting the presence/attachment of the accessory device 104. The interface may also provide a power coupling for exchange of power.

The connection portion 202 is flexibly connected to a portion of the accessory device 104 that includes the keys through use of the flexible hinge 106. Thus, when the connection portion 202 is physically connected to the computing device the combination of the connection portion 202 and the flexible hinge 106 supports movement of the accessory device 104 in relation to the computing device 102 that is similar to a hinge of a book.

For example, in at least some implementations, rotational movement may be supported by the flexible hinge 106 such that the accessory device 104 may be placed against the display device 110 of the computing device 102 and thereby act as a cover. The accessory device 104 may also be rotated so as to be disposed against a back of the computing device 102, e.g., against a rear housing of the computing device 102 that is disposed opposite the display device 110 on the computing device 102.

Naturally, a variety of other orientations are also supported. For instance, the computing device 102 and an accessory device 104 may assume an arrangement such that both are laid flat against a surface as shown in FIG. 1. In another instance, a typing arrangement may be supported in which the accessory device 104 is laid flat against a surface and the computing device 102 is disposed at an angle to permit viewing of the display device 110, e.g., such as through use of a kickstand disposed on a rear surface of the computing device 102. Other instances are also contemplated, such as a tripod arrangement, meeting arrangement, presentation arrangement, and so forth.

The connecting portion 202 is illustrated in this example as including magnetic coupling devices 204, 206, mechanical coupling protrusions 208, 210, and a plurality of communication contacts 212. The magnetic coupling devices 204, 206 are configured to magnetically couple to complementary magnetic coupling devices of the computing device 102 through use of one or more magnets. In this way, the accessory device 104 may be physically secured to the computing device 102 through use of magnetic attraction.

The connecting portion 202 also includes mechanical coupling protrusions 208, 210 to form a mechanical physical connection between the accessory device 104 and the computing device 102. The mechanical coupling protrusions 208, 210 are shown in greater detail in the following figure.

Figure 3:
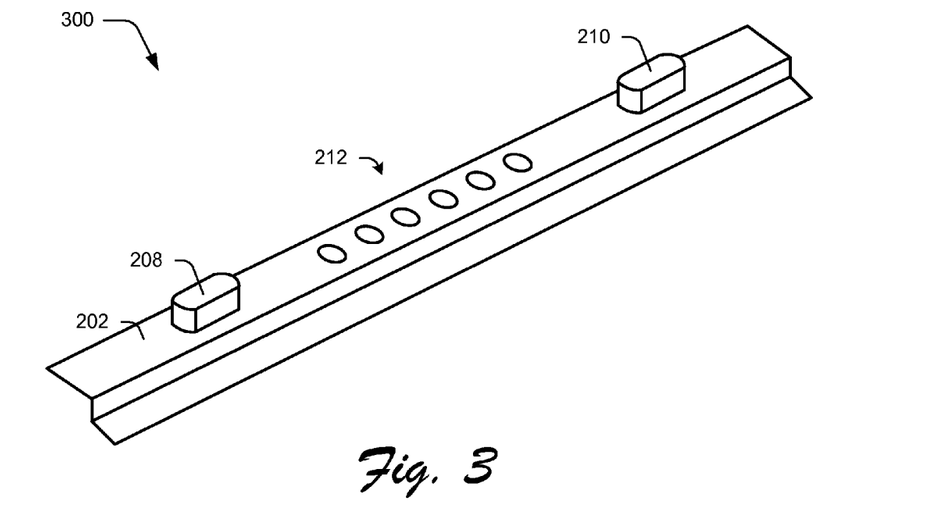
FIG. 3 depicts an example implementation showing a perspective view of a connecting portion of FIG. 2 that includes mechanical coupling protrusions and a plurality of communication contacts.

FIG. 3 depicts an example implementation 300 shown a perspective view of the connecting portion 202 of FIG. 2 that includes the mechanical coupling protrusions 208, 210 and the plurality of communication contacts 212. As illustrated, the mechanical coupling protrusions 208, 210 are configured to extend away from a surface of the connecting portion 202, which in this case is perpendicular although other angles are also contemplated. Mechanical coupling protrusions 208, 210 that are configured in this manner may be referred to as "fangs" due to the way in which they extend away from a surface of the connecting portion 202.

The mechanical coupling protrusions 208, 210 are configured to be received within complimentary cavities within the channel of the computing device 102. When so received, the mechanical coupling protrusions 208, 210 promote a mechanical binding between the devices when forces are applied that are not aligned with an axis that is defined as correspond to the height of the protrusions and the depth of the cavity. In at least some embodiments, the mechanical coupling protrusions 208, 210 may also be configured to form a power coupling through which power exchanges described herein may occur.

For example, when a force is applied that does coincide with the longitudinal axis described previously that follows the height of the protrusions and the depth of the cavities, a user overcomes the force applied by the magnets solely to separate the accessory device 104 from the computing device 102. However, at other angles the mechanical coupling protrusion 208, 210 are configured to mechanically bind within the cavities, thereby creating a force to resist removal of the accessory device 104 from the computing device 102 in addition to the magnetic force of the magnetic coupling devices 204, 206. In this way, the mechanical coupling protrusions 208, 210 may bias the removal of the accessory device 104 from the computing device 102 to mimic tearing a page from a book and restrict other attempts to separate the devices.

The connecting portion 202 is also illustrated as including a plurality of communication contacts 212. The plurality of communication contacts 212 is configured to contact corresponding communication contacts of the computing device 102 to form a communicative coupling between the devices. As mentioned, the communicative coupling may be used to convey credentials and/or other information that may be employed by the computing device 102 and in particular the authentication module 114 to authenticate an accessory device 104. The communication contacts 212 may be configured in a variety of ways, such as through formation using a plurality of spring loaded pins that are configured to provide a consistent communication contact between the accessory device 104 and the computing device 102. Therefore, the communication contacts may be configured to remain during minor movement or jostling of the devices. A variety of other examples are also contemplated, including placement of the pins on the computing device 102 and contacts on the accessory device 104, incorporating at least some communication contacts 212 with the mechanical coupling protrusions 208, 210 and/or complimentary cavities, and so forth. Moreover, in addition or alternatively to forming a power coupling through mechanical coupling protrusions 208, 210 (e.g., fangs) as mentioned above, at least some of the communication contacts 212 may be configured to create a power coupling suitable for power exchange.

Figure 4:
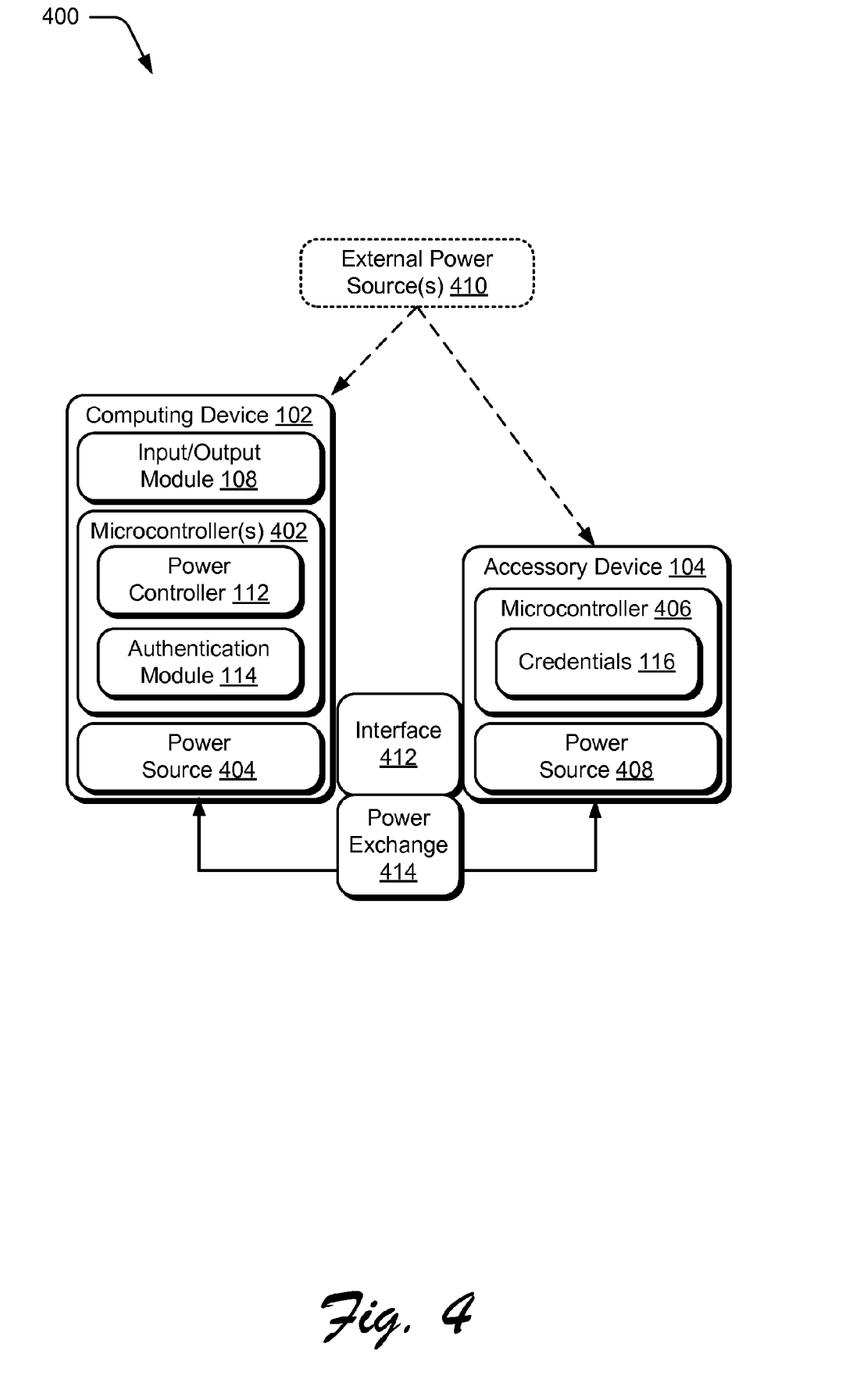
FIG. 4 depicts an example computing device and accessory device of FIG. 1 in greater detail.

FIG. 4 depicts generally at 400 an example computing device 102 and accessory device 104 in greater detail. In FIG. 4, the computing device 104 is depicted as having a power controller 112 and authentication module 114 that are illustrated as being provided by one or more microcontrollers 402. In one embodiment, different microcontrollers may be employed to implement the power controller 112 and authentication module 114. In another approach, one microcontroller may be configured to implement functionality of both the power controller 112 and authentication module 114. The computing device 104 further includes an associated power source 404, such as one or more internal batteries.

The accessory device is also depicted as having a respective microcontroller 406 and its own power source 408 (e.g. an accessory battery) that is separate from the power source 404 of the computing device 102. As further illustrated, both the computing device 102 and accessory device 104 may also be configured to employ external power sources 410, such as through the use of respective power adapters connected to a wall socket or other source.

The example microcontrollers represent hardware devices/systems that are designed to perform a predefined set of designated tasks. Microcontrollers may represent respective on-chip systems/circuits having self-contained resources such as processing components, I/O devices/peripherals, various types of memory (ROM, RAM, Flash, EEPROM), programmable logic, and so forth. Different microcontrollers may be configured to implement embedded applications/functionality that are implemented at least partially in hardware and perform corresponding tasks.

In particular, the example microcontrollers 402, 406 enable performance of tasks for device authentication and power management outside of operation of a general purpose processing system and other applications/components of the computing device or accessory device. Generally, power consumption of the microcontrollers is low in comparison with operating a general purpose processing system for a device.

Accordingly, when implemented via microcontrollers, the power controller 112 and authentication module 114 may operate using relatively low power, independently of operating a "primary" processing system of a host computing device, and/or without booting/executing an operating system or using other device components and applications. In other words, the microcontrollers may operate to perform authentication and some power management tasks in a low power mode without having to operate or supply power to the processing system and other device components (e.g., device memory, network interface, display device, etc.) and/or without completely starting-up or waking-up the computing device.

Generally speaking, the authentication of an accessory device as described above and below is a prerequisite to power exchange between an accessory device and host computing device. When either the computing device 102 or accessory device 104 has little or no available power (e.g., battery drained and no connection to an external source), though, a limited amount of power exchange may be allowed to enable interactions for authentication and/or subsequent power management decisions. For example, enough power to operate the power controller 112 and/or authentication module 114 may be supplied by an accessory device when the host device otherwise does not have sufficient power. Likewise, the host device may supply power sufficient to run a microcontroller 406 of an accessory device 104 to obtain credentials from the accessory device 104 used for authentication of the device. The amount of power exchanged during such interactions may be limited in various ways including restricting power to a designated power level (e.g., voltage/current) and/or setting a time limit on the power exchange. In one particular example, a maximum of approximately five hundred milliwatts at five volts is designated for initial authentication/power management interactions between a host device and accessory. A relatively small time limit such as thirty seconds or one minute may also be imposed. In this manner, unauthorized devices may exchange a limited amount of power initially to enable authentication and at least some basic power management tasks. Accordingly, the techniques for accessory device authentication may be employed in cold boot situations in which either the host or accessory is in a drained battery state and therefore may be inoperable without supplemental power.

As further depicted in FIG. 4, the computing device 102 and accessory device 104 may be attached and connected via a suitably configured interface 412, one example of which is the connection portion 202 previously described. The interface 412 may be configured to create a communicative and physical coupling between the computing device 102 and accessory device 104. The interface 412 is also configured to enable power exchange 414 to occur between the computing device 102 and accessory device 104. Additional details of these and other aspects of accessory device authentication are provided in relation to following example procedures.

Having considered the preceding discussion of an example operating environment and devices, consider now a discussion of an example procedure which includes further implementation details regarding the example techniques for accessory device authentication.

Example Procedures

The following discussion describes accessory device authentication techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the example operating environment 100 of FIG. 1 and the example devices of FIGS. 2-4, respectively.

Figure 5:
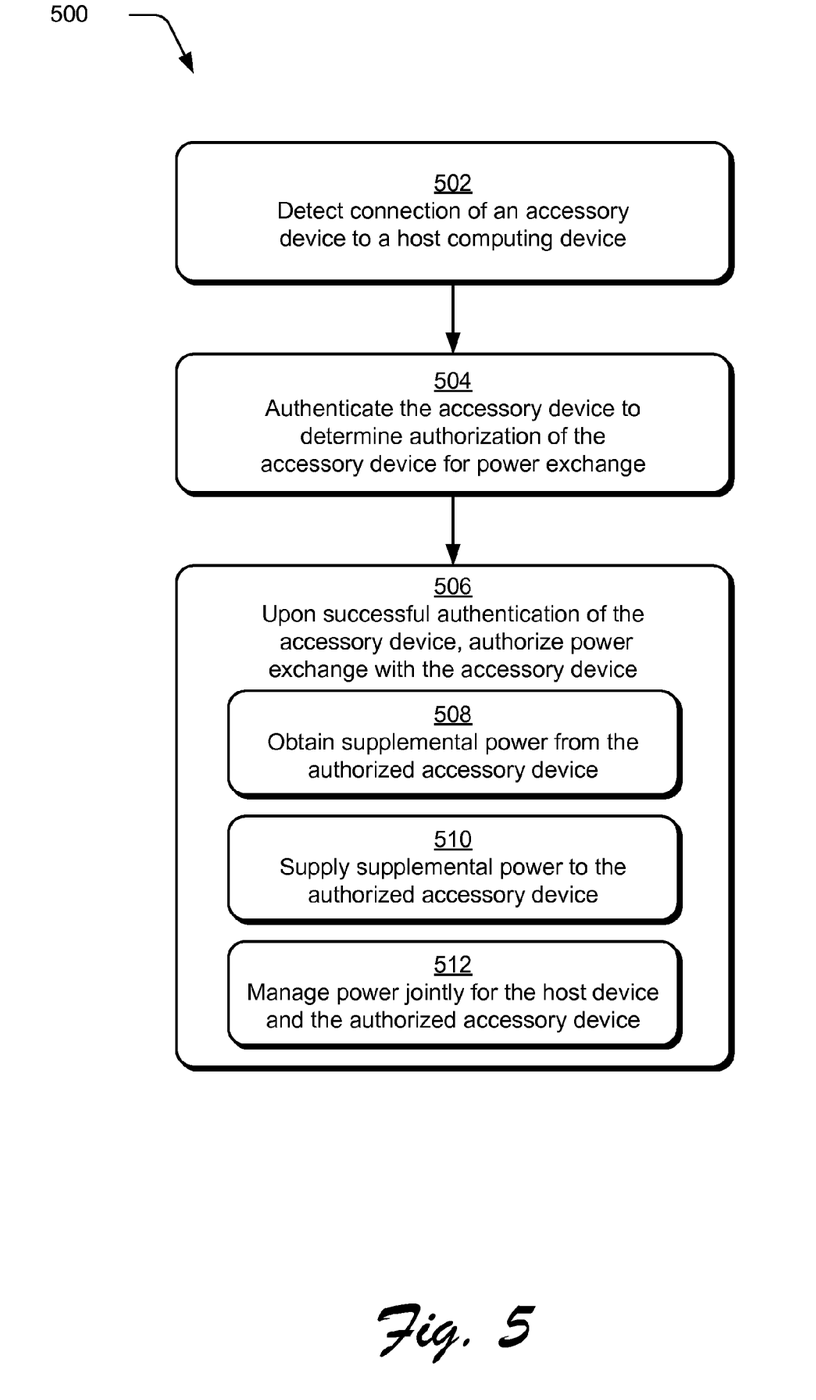
FIG. 5 depicts an example procedure in accordance with one or more embodiments.

FIG. 5 depicts an example procedure 500 in which an accessory device is authenticated. In at least some embodiments, the procedure may be performed by a suitably configured computing device, such as the example computing device 102 of FIG. 4 that includes or otherwise make use of one or more microcontrollers 402.

Connection of an accessory device to a host computing device is detected (block 502). For example, a computing device 102 may employ various techniques to detect when an accessory device is attached. One way this may occur is through communicative couplings formed when the accessory device is attached. For instance, communication contacts 212 incorporated with an interface 412 may cause an attach event to be generated when an accessory device is attached. By way of example, an attach event may be generated when fangs used to physically join the host and accessory are mated with corresponding cavities. A detach event may be generated when the accessory device is subsequently detached. As mentioned, the fangs may be on the device and cavities on the host, or vice versa. In another approach, an interface 412 may incorporate a switch that operates when an accessory device is physically attached. Toggling of the switch may cause an attach event to be produced when an accessory is connected. Other kinds of presence detectors may also be employed to detect attachment of an accessory, such as an optical sensor, spring loaded button, a signal detector, and so forth.

When an appropriate attach event is generated in these or another suitable manner, the attach event may be detected by the computing device 102. For example, the power controller 112 of a computing device (e.g., a microcontroller 402) may detect attach events and initiate appropriate actions to authenticate the accessory device 104 in response to the detection. This may involve invoking the authentication module 114 to perform the authentication of the accessory device 104. If the host device is in a drained battery state, a limited amount of power may first be supplied to the host device by the accessory as previously described. The limited amount of power may be sufficient to boot and operate the power controller 112, authentication module 114, and/or corresponding microcontrollers 402. The power controller 112 may then look for attached devices and initiate authentication if appropriate.

In particular, the accessory device is authenticated to determine authorization of the accessory device for power exchange (block 504). As mentioned, authentication of the accessory device 104 may occur in various ways based on credentials 116 associated with the accessory device 104. The authentication may occur based upon I/O communications between microcontroller(s) 402 and a microcontroller 406 of the host computing device and accessory, respectively. Such communications may occur via communication contacts 212 that create a communicative coupling as described previously. For example, communication contacts 212 may create a communication channel that may be employed for authentication interactions by way of a single pin or multiple pin connection between the host computing device and accessory.

In at least some embodiments, the authentication module 114 may operate under the direction of the power controller 112 to request or otherwise obtain credentials 116 from the accessory device 104 via a suitable communication channel. The authentication module 114 may then verify the credentials to ensure that the accessory device 104 is an authorized device. The authentication module 114 may provide a notification with the authentication result or otherwise expose a result of authentication to the power controller 112 for subsequent power management decisions. The power controller 112 and/or authentication module 114 may also identify capabilities of the accessory such as identifying the type of device (e.g., keyboard, game controller, mouse, musical device, adapter, etc.), whether the accessory has a battery, the charge state of an accessory battery, power supply capabilities/ranges, and so forth. The power controller 112 may employ the identified capabilities to make the power management decisions and implement an appropriate power management scheme.

Various authentication techniques and credentials may be employed. By way of example and not limitation, authentication may be based upon a username and password, a unique device identifier such as a media access control (MAC) address, an alphanumeric code, an encrypted secret, or other suitable credentials. In some embodiments, the credentials may be encoded using a designated hash algorithm such as MD5 message digest algorithm or SHA-1 hash algorithm to name a few examples. The authentication module 114 may be configured to decode/check the credentials using the designated hash algorithm. The authentication module 114 may also compare the credentials to a list/database of known credentials for authorized devices. Authentication is successful when the authentication module 114 matches the credentials to known credentials for authorized devices. If credentials do not match, then the authentication is unsuccessful. In this case, exchange of power may be prevented or restricted to specified levels as discussed previously.

Upon successful authentication of the accessory device, exchange of power with the accessory device is authorized (block 506). This may include authorizing the host device to obtain supplemental power from the authorized accessory device (block 508) and/or authorizing the host device to supply supplemental power to the authorized accessory device (block 510). For example, the power controller 112 may determine power states for the accessory device and host device and manage exchange of power between the devices accordingly. Based on a determination that supplemental power for the host device is available from the accessory, power may be exchanged from the accessory to the host. Likewise, based in a determination that the accessory lacks sufficient power to operate, the power controller 112 may cause power to be exchanged from the host computing device to the accessory. Further, power is managed jointly for the host device and the authorized accessory device (block 512).

In particular, the power controller 112 may operate to selectively manage power from various available sources including supplemental power available from an accessory device 104. The power controller 112 may manage power in accordance with an overall power management scheme for the computing device as discussed in greater detail below.

In general, authorized devices may supply or receive power within a "normal" operating power range/mode whereas unauthorized devices may be restricted to a limited power range/mode. Thus, an authorized accessory device may exchange power with a host computing at "normal" levels and/or within specified ranges designed for the system. In contrast, exchange of power with unauthorized may be restricted to particular scenarios, limited power ranges, and/or time limits. By way of example and not limitation, the power system may be configured to support an operating power mode that provides approximately forty watts continuous at a maximum of five amps. The power system may further be configured to enforce a limited power mode as mentioned above in which power exchange is limited to approximately five hundred milliwatts at approximately five volts. In the limited power mode the power exchange may also be limited by a selected time limit such as thirty seconds, a minute, and so forth. The time limit may be selected to provide sufficient time to initiate/perform authentication and switch to the operating power mode if appropriate. If authentication is not successful within the time limit, further power exchange with the accessory device may be prevented. A variety of different configurations and particular power levels for different power modes are contemplated of which the enumerated configurations are but a few illustrative examples.

In accordance with the foregoing, a computing device 102 may include a power controller 112 configured to implement a power management scheme for the device. In general, the power controller 112 is responsible for selective switching between multiple available power sources as well as charging of internal and accessory batteries. Available power sources may include power from an internal battery, a power supply adapter connected to an external source, and/or a battery of an authorized accessory device. The power controller 112 may include or make use of an authentication module 114 to authenticate accessory devices 104 and authorize power exchange with the accessory devices 104. The power controller 112 further operates to restrict power exchange with unauthorized devices.

Once an accessory device is authenticated/authorized, though, the power controller 112 may manage power for the accessory device jointly with the host computing device 102 in accordance with a power management scheme. Some example details and characteristics of a power management scheme that may be implemented by the power controller 112 are now described.

The power management scheme provides dynamic switching between available power sources (including power from authorized accessories) to maintain uninterruptible power to the load. In the event of a failure of either the external power adapter or internal battery power the system may automatically shift to an alternate available power source without user intervention. The power controller 112 operates to prevent power exchange with any accessory device unless the accessory device has passed authentication as described above.

Authentication is typically completed in response to attachment of the accessory to the host. Re-authentication may also be configured to occur when the accessory device wakes up from a sleep or hibernate state. Authentication may also be lost when an accessory is detached and accordingly, the authentication for the accessory may be repeated upon reattachment to the host computing device.

The power controller 112 may be configured to switch to external power source supplied by a power adapter if available. For instance, the power controller 112 may detect presence of the power adapter and shift the operating power source from battery power to the power adapter in response to the detection. This enables charging of batteries when excess power is available from the external supply. Charging of both an internal battery and an accessory battery of an authorized accessory may be supported. Further, both an internal and accessory batteries may be charged simultaneously if sufficient power is available. If the system is currently being powered from the power adapter, the system may terminate battery charging and shift back to operation on battery power when the power adapter is disconnected or power from the adapter is otherwise interrupted.

The accessory battery associated with an authorized accessory is an optional power source for the operation of the computing device 102 and as a power source for the accessory device 104 itself. The accessory battery may supplement the internal battery when power is not available via a power adapter/external source. In one approach, the power controller 112 is configured to selectively cause switching between the internal battery and an accessory battery based upon charge level of the batteries. In this approach, the system may be arranged to employ the batteries one at a time. In addition or alternatively, the system may be configured to employ power supplied simultaneously by the internal and external accessory battery in some scenarios.

The power controller 112 may be further configured to control the way in which multiple available batteries (e.g., internal and accessory) are charged and discharged according to the power management scheme. Discharging and charging may be managed in various ways based at least in part upon the charge levels of the available batteries. By way of example and not limitation, the power management scheme may be designed to generally prioritize maintaining the charge level of the internal battery over accessory batteries.

In this approach, the system uses power from accessory batteries before discharging the main internal battery. The discharge of batteries may occur sequentially in a number of discharge stages that correspond to designated charge capacity levels or percentages. For example, an accessory battery may first be discharged to a level defined as "critical," such as five or ten percent remaining charge. Then, the system may switch to using the main internal battery and discharge it to the critical level. The load may again be shifted back to the accessory battery when both batteries are at the critical level. The accessory battery may be further discharged to a "discontinue" level (e.g., two percent remaining charge) defined as point at which the system discontinues use of the battery. The power controller 112 may then cause a switch back to the main internal battery, which is similarly discharged to the discontinue level. When both batteries have reached the discontinue level, the computing device 102 may transition to a shutdown state.

For charging, both batteries may be charged simultaneous if there is sufficient power to do so. If available power is not sufficient to support simultaneous charging, the power controller 112 may implement sequential charging with priority again being given to charging of the main internal battery.

Similar to the discharge techniques just described, charging of multiple batteries may also occur in multiple stages that correspond to selected charge levels or percentages. For example, the main internal battery may be charged first to a designated "pre-charge" level, such as seventy or eighty percent. Then charging switches to the accessory battery, which is also charged to the designated pre-charge level. After this, the main internal battery is first topped-off to complete the charge to a "full charge" level and then the accessory battery is also topped-off to complete the charge to the full charge level. Naturally, the described stages, levels, and selected percentages for discharging and charging are provided as examples. Various alternative implementations may employ different numbers of stages and/or different selected charge percentages for the stages in a comparable manner.

Having considered the foregoing example procedures, consider now a discussion of example systems and devices that may be employed to implement aspects of accessory device authentication techniques in one or more embodiments.

Example System and Device

Figure 6:
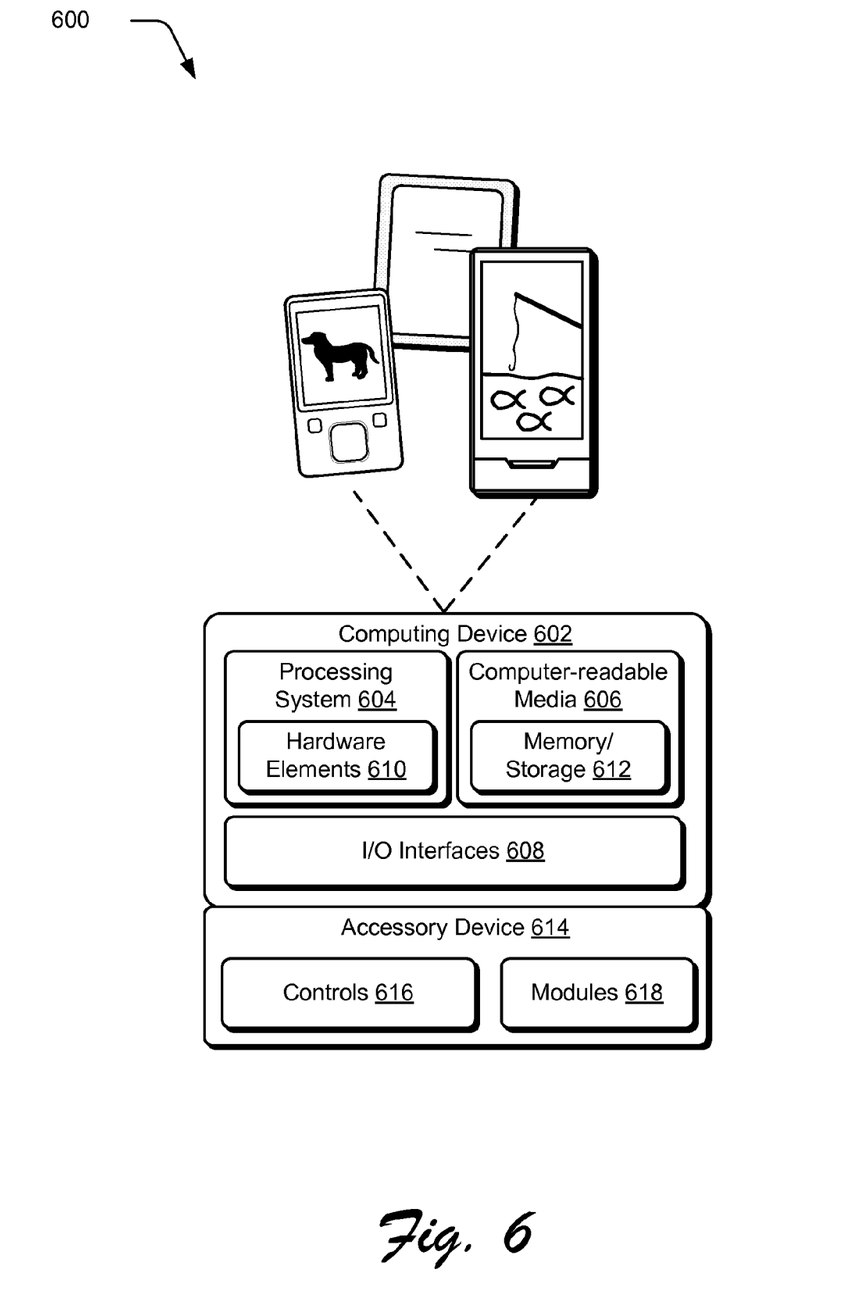
FIG. 6 illustrates an example system including various components of an example device that can be implemented as any type of computing device to implement embodiments of the techniques described herein.

FIG. 6 illustrates an example system generally at 600 that includes an example computing device 602 that is representative of one or more computing systems and/or devices that may implement the various techniques described herein. The computing device 602 may be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways to support user interaction.

The computing device 602 is further illustrated as being communicatively and physically coupled to an accessory device 614 that is physically and communicatively removable from the computing device 602. In this way, a variety of different input devices may be coupled to the computing device 602 having a wide variety of configurations to support a wide variety of functionality. In this example, the accessory device 614 includes one or more controls 616, which may be configured as press-sensitive keys, mechanically switched keys, buttons, and so forth.

The accessory device 614 is further illustrated as include one or more modules 618 that may be configured to support a variety of functionality. The one or more modules 618, for instance, may be configured to process analog and/or digital signals received from the controls 616 to determine whether an input was intended, determine whether an input is indicative of resting pressure, support authentication of the accessory device 614 for operation with the computing device 602, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, microcontroller devices, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

Conclusion

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method implemented by a host computing device comprising:
   detecting a physical connection of an accessory device to the host computing device via an interface configured to enable physical connections of one or more accessory devices to the host computing device at different times, the interface including magnetic coupling devices to magnetically secure the accessory devices to the host computing device;
   authenticating the accessory device to determine authorization of the accessory device for power exchange with the host computing device; and
   upon successful authentication of the accessory device, authorizing power exchange to and from the accessory device via the interface.

2. A method as described in claim 1, further comprising obtaining supplemental power from the authorized accessory device when power exchange with the accessory device is authorized.

3. A method as described in claim 1, further comprising supplying supplemental power to the authorized accessory device when power exchange with the accessory device is authorized.

4. A method as described in claim 1, further comprising managing power jointly for the host computing device and the accessory device when power exchange with the accessory device is authorized.

5. A method as described in claim 1, further comprising:
   when authentication of the accessory device is not successful, restricting power exchange with the accessory device.

6. A method as described in claim 1, wherein the detecting, authenticating, and authorizing are performed via one or more microcontrollers of the host computing device.

7. A method as described in claim 6, further comprising:
   when the host computing device does not have sufficient power to operate the one or more microcontrollers, obtaining a restricted amount of power from the accessory device sufficient to operate the one or more microcontrollers to authenticate the accessory device for subsequent power exchange.

8. A method as described in claim 1, wherein the authenticating comprises:
   requesting credentials from the accessory device via a communication channel established via the connection;
   obtaining the credentials supplied by the accessory device; and
   verifying the credentials by checking the credentials against known credentials for authorized devices.

9. A method implemented by a host computing device comprising:
   exchanging a restricted amount of power between the host computing device and an accessory device that is not currently authenticated for power exchange with the host computing device, the restricted amount of power sufficient to perform authentication of the accessory device;
   authenticating the accessory device for power exchange with the host computing device based on credentials supplied by the accessory device, the exchanging and authenticating performed responsive to connection of the accessory device to the host computing device to create a physical coupling of the accessory device to the host computing, the exchanging and authenticating performed via an interface of the host computing device that creates the physical coupling of the accessory device to the host computing and includes one or more communication contacts to form a communicative coupling for power exchange when in contact with corresponding communication contacts of the accessory device; and
   upon successful authentication of the accessory device,
      determining whether supplemental power is available from the accessory device; and
      obtaining the supplemental power from the accessory device for operation of the host computing device responsive to determining that supplemental power is available.

10. A method as described in claim 9, wherein the exchanging and authenticating are performed by one or more microcontrollers of the host computing device separate from a primary processing system of the host computing device.

11. A method as described in claim 9, wherein the authenticating comprises:
   obtaining the credentials from the accessory device, the credentials encoded using a designated hash algorithm;
   decoding the credentials using the designated hash algorithm; and
   comparing the credentials against a list of know credentials for authorized devices.

12. A method as described in claim 9, further comprising:
   preventing subsequent power exchange with the accessory device when the authentication is unsuccessful.

13. A method as described in claim 9, further comprising:
   upon successful authentication of the accessory device, managing power jointly for the host computing device and the accessory device.

14. A method as described in claim 13, wherein managing comprises selectively switching between multiple power sources available to the host computing device including at least power supplied via a power adapter, an internal battery of the host computing device, and an accessory battery of the accessory device.

15. A method as described in claim 9, wherein the interface further includes magnetic coupling devices to secure the host computing device to the accessory device when in physical contact with corresponding magnetic coupling devices of the accessory device.

16. A method as described in claim 9, further comprising:
   responsive to determining that supplemental power is not available, determining that the accessory device lacks sufficient power to operate; and
   supplying power from the host computing device for operation of the accessory device.

17. A host computing device comprising:
   an interface including magnetic coupling devices and a plurality of communication contacts to enable connection of one or more accessory devices to the host computing device to create physical and communicative couplings of the one or more accessory devices when attached to the host computing device at different times;
   one or more microcontrollers configured to implement: a power controller and an authentication module,
   the authentication module operable to authenticate the one or more accessory devices responsive to connection of the one or more accessory devices to the interface and expose results of the authentication to the power controller for subsequent power management decisions,
   the power controller operable to control power exchange back and forth between the host device and the one or more accessory devices based at least in part upon the results of the authentication including:

authorizing power exchange with devices of the one or more accessory devices for which authentication is successful; and restricting power exchange with devices of the one or more accessory devices for which authentication is not successful.

18. A host computing device as described in claim 17, wherein the power controller is further operable to allow limited exchange of power between the host computing device and the one or more accessory devices prior to authentication of the one or more accessory devices to enable operation of the one or more microcontrollers to perform the authentication.

19. A host computing device as described in claim 18, wherein the communicative coupling created for a particular accessory device when attached to the host computing device, establishes a communication channel between the one or more microcontrollers of the host computing device and a microcontroller of the particular accessory device through which credentials of the particular accessory device are conveyed to enable the authentication module to authenticate the particular accessory device.

20. A host computing device as described in claim 18, wherein the power controller and authentication module are implemented via two different microcontrollers of the host computing device.

* * * * *